(12) United States Patent
Lee (10) Patent No.: US 8,579,005 B2
(45) Date of Patent: Nov. 12, 2013

(54) INDIVIDUALLY OPERATIVE ROLL BLIND TYPE PANORAMA ROOF

(75) Inventor: Ho Ryul Lee, Seongnam-si (KR)

(73) Assignee: Hyundai Motor Company, Seoul (KR)

(*) Notice: Subject to any disclaimer, the term of this patent is extended or adjusted under 35 U.S.C. 154(b) by 309 days.

(21) Appl. No.: 13/181,870

(22) Filed: Jul. 13, 2011

(65) Prior Publication Data

US 2012/0138241 A1    Jun. 7, 2012

(30) Foreign Application Priority Data

Dec. 6, 2010    (KR) .................. 10-2010-0123217

(51) Int. Cl.
- *E06B 9/08* (2006.01)
- *B60J 1/20* (2006.01)
- *B60J 3/00* (2006.01)
- *B60J 11/00* (2006.01)

(52) U.S. Cl.
USPC ...... 160/122; 160/120; 160/370.22; 296/97.8

(58) Field of Classification Search
USPC .............. 160/121.1, 122, 133, 241–245, 265, 160/370.22; 296/142, 143, 214; 475/271, 475/286, 154

See application file for complete search history.

(56) References Cited

U.S. PATENT DOCUMENTS

| | | | |
|---|---|---|---|
| 6,481,787 B1* | 11/2002 | Laux et al. ................. | 296/214 |
| 7,381,329 B1* | 6/2008 | Moss ........................... | 210/255 |
| 7,469,960 B2* | 12/2008 | Koelbl et al. ............... | 296/214 |
| 8,419,119 B2* | 4/2013 | Nakamura et al. ........... | 296/214 |
| 2008/0023155 A1* | 1/2008 | Beierl et al. ............... | 160/121.1 |
| 2013/0145871 A1* | 6/2013 | Lee et al. ..................... | 74/89.14 |

FOREIGN PATENT DOCUMENTS

| | | |
|---|---|---|
| JP | 2003-155885 A | 5/2003 |
| JP | 2008-128287 A | 6/2008 |
| JP | 2010-982 A | 1/2010 |
| KR | 2003-0082892 A | 10/2003 |
| KR | 10-2004-0084655 A | 10/2004 |

* cited by examiner

*Primary Examiner* — Katherine Mitchell
*Assistant Examiner* — Jeremy Ramsey
(74) *Attorney, Agent, or Firm* — Morgan, Lewis & Bockius LLP (57) ABSTRACT

An individually operative roll blind type panorama roof may include a planetary gear set including a sun gear to which a driving force of a motor may be applied, at least a planetary gear engaged with the sun gear, a ring gear engaged with the at least a planetary gear, and a carrier gear to which the at least a planetary gear may be rotatably mounted, a first roll blind interlocked with the ring gear through a first cable and configured to be driven by the ring gear, a second roll blind interlocked with the carrier gear through a second cable and configured to be driven by the carrier gear, and a gear stopping device selectively engaged with gear teeth of the ring gear or the carrier gear so as to stop the ring gear or the carrier gear.

3 Claims, 9 Drawing Sheets

INDIVIDUALLY OPERATIVE ROLL BLIND TYPE PANORAMA ROOF

CROSS-REFERENCE TO RELATED APPLICATION

The present application claims priority to Korean Patent Application No. 10-2010-0123217 filed Dec. 6, 2010, the entire contents of which is incorporated herein for all purposes by this reference.

BACKGROUND OF THE INVENTION

1. Field of the Invention

The present invention relates to an individually operative roll blind type panorama roof, and more particularly to a panorama roof in which a front roll blind and a rear roll blind can be individually operated with a single motor using a planetary gear set.

2. Description of Related Art

Recently, panorama roofs with longer conventional sunroofs than the conventional ones have been installed in many mass-produced vehicles, thus expanding most of the roof area to be open. Most roof panels of such a panorama roof are made of glass to provide a clear view with openness for passengers.

As the panorama roof is provided along an entire area of the vehicular roof, when a blind plate generally used in a sunroof vehicle is mounted to the vehicle to block sunlight, it is difficult to hide it. Therefore, a roll blind apparatus is used instead of using a blind plate in a vehicle having a panorama roof.

A drive unit of a panorama unit is generally divided into a roll blind section and a glass section, in which case the roll blind section includes a front roll blind configured to shield the front side of the roof and a rear roll blind configured to shield the rear side thereof. Further, there is required at least one motor for the driving of the glass section, the front roll blind and the rear roll blind, respectively.

Here, two separate motors are needed to individually operate the front roll blind and the rear roll blind, increasing the number of motors, which is not preferable in the aspects of manufacturing costs and weight.

Figure 6:
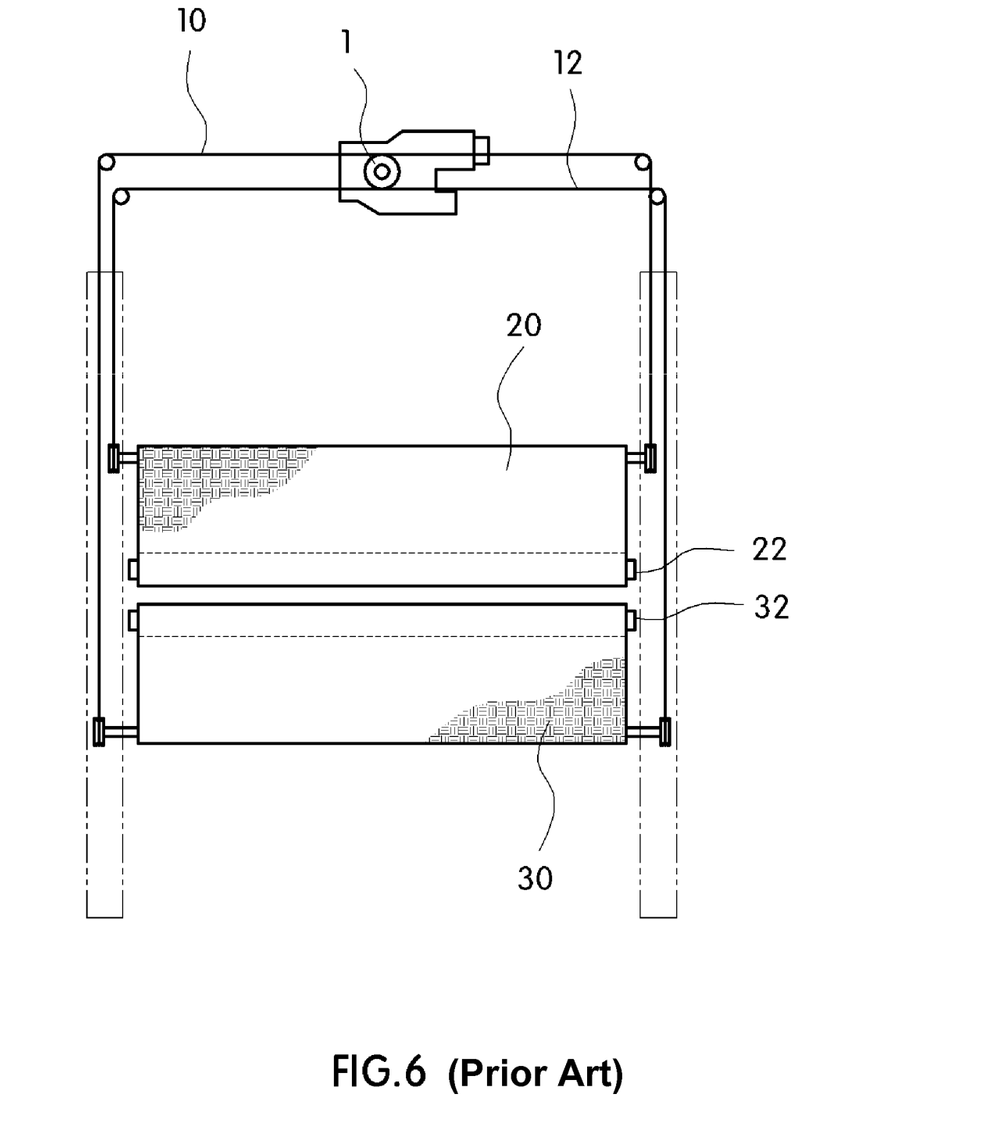
FIG. 6 is a schematic view illustrating conventional operations of a front roll blind and a rear roll blind using one motor.

In order to solve these problems, a structure in which a front roll blind and a rear roll blind are operated with one motor has been suggested as in FIG. 6.

As illustrated in FIG. 6, in order to simultaneously operate a front roll blind 20 and a rear roll blind 30 with one motor 1, a first simultaneously driven cable 10 and a second simultaneously driven cable 12 operated in opposite directions may be interlocked with the roll blinds 20 and 30 by driving of a motor 1. Opposite ends of the first simultaneously driven cable 10 are connected to the front roll blind 20 and the rear roll blind 30 respectively, and opposite ends of the second simultaneously driven cable 12 likewise are connected to the front roll blind 20 and the rear roll blind 30 respectively.

Then, as the motor 1 rotates, the first simultaneously driven cable 10 and the second simultaneously driven cable 12 are operated in opposite manners to simultaneously open or close the front roll blind 20 and the rear roll blind 22. That is, as the motor 1 rotates clockwise in FIG. 6, the first simultaneously driven cable 10 configured to be moved in association with the motor 1 is driven clockwise and the second simultaneously driven cable 12 configured to be moved in association with the motor 1 is driven counterclockwise. Accordingly, the front roll blind 20 and the rear roll blind 20 are introduced to the rollers 22 and 32 to be simultaneously opened. Further, as the motor 1 rotates counterclockwise in FIG. 6, the first simultaneously driven cable 10 configured to be moved in association with the motor 1 is driven counterclockwise and the second simultaneously driven cable 12 configured to be moved in association with the motor 1 is driven clockwise. Accordingly, the front roll blind 20 and the rear roll blind 20 are withdrawn from the roller 22 and 32 to be simultaneously closed.

However, in the structure of FIG. 6, the front roll blind 20 and the rear roll blind 30 are undesirably operated simultaneously. That is, when a passenger in the front seat opens the roll blinds, the rear roll blind 30 as well as the front roll blind 20 is opened together, thereby making the passenger in the rear seat uncomfortable due to the exposure to incoming sunlight.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to a panorama roof in which a front roll blind and a rear roll blind can be individually operated with a single motor using a planetary gear train.

In an aspect of the present invention, the individually operative roll blind type panorama roof may include a planetary gear set including a sun gear to which a driving force of a motor may be applied, at least a planetary gear engaged with the sun gear and configured to rotate and revolve, a ring gear engaged with the at least a planetary gear and configured to move with rotations of the at least a planetary gear, and a carrier gear to which the at least a planetary gear may be rotatably mounted and configured to move in association with revolutions of the at least a planetary gear, a first roll blind interlocked with the ring gear through a first cable and configured to be driven by the ring gear, a second roll blind interlocked with the carrier gear through a second cable and configured to be driven by the carrier gear, and a gear stopping device selectively engaged with gear teeth of the ring gear or the carrier gear so as to stop the ring gear or the carrier gear.

The first roll blind and the second roll blind may form a roll blind set including the front roll blind and the rear roll blind.

The gear stopping device may include a gear stopping member selectively engaged with gear teeth of the ring gear or the carrier gear, and an actuator connected to the gear stopping member and configured to move the gear stopping member between gear teeth of the ring gear and gear teeth of the carrier gear.

Accordingly, the individually operative roll blind type panorama roof of the present invention can increase convenience for a user as a front roll blind and a rear roll blind may be individually driven.

Further, as the roll blinds are individually operated with one motor, manufacturing costs and weight of the panorama roof can be reduced and the product value of the panorama roof can be increased.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described below in detail with reference to the accompanying drawings such that those skilled in the art to which the present invention pertains can easily practice the present invention.

Figure 1:
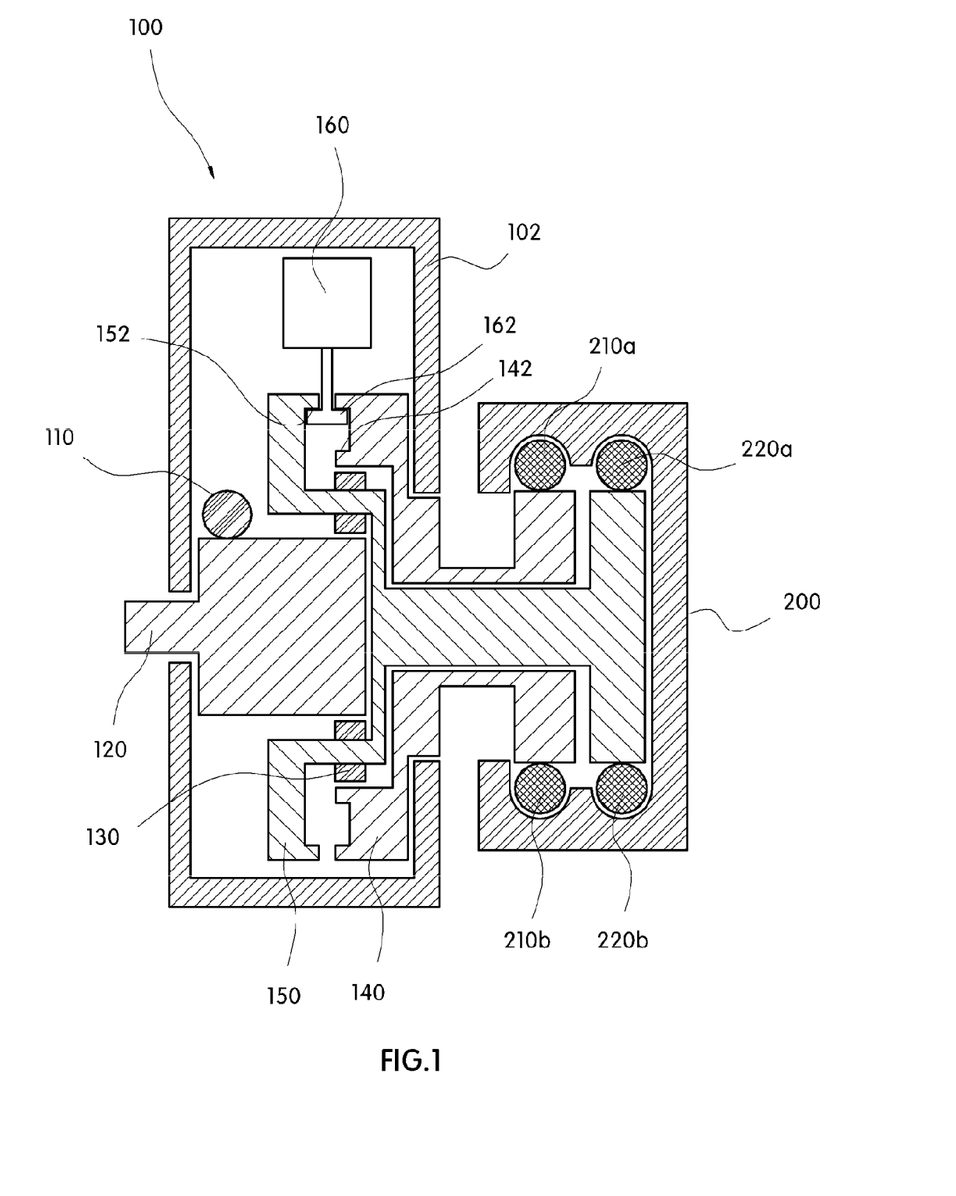
FIG. 1 is a view illustrating connections between a planetary gear set, and a first cable and a second cable of an individually operative roll blind type panorama roof according to an exemplary embodiment of the present invention.

FIG. 1 illustrates connections between a planetary gear set 100, and a first cable and a second cable of an individually operative roll blind type panorama roof according to an exemplary embodiment of the present invention.

As illustrated in FIG. 1, the panorama roof according to the exemplary embodiment of the present invention includes a planetary gear set 100, a first cable, a second cable, and a gear stopping device. As an example of the gear stopping device, FIG. 1 illustrates a gear stopping member 162 and a solenoid 160 configured to move the gear stopping member 162.

First, the planetary gear set 100 according to the exemplary embodiment of the present invention includes a sun gear 120, a pair of planetary gears 130, a ring gear 140, and a carrier gear 150. The gear set 100 is installed with a motor housing 102 and selectively transfers a driving force of the motor 1 to the first cable or the second cable according to the exemplary embodiment of the present invention.

A driving force is transferred to the sun gear 120 through a motor driving gear 110 to rotate the sun gear 120. The planetary gears 130 are engaged with an outer peripheral surface of the sun gear 120 such that they rotate and revolve in association with movement of the sun gear 120. Then, rotations and revolutions of the planetary gears 130 are determined by the gear stopping device as described below.

The ring gear 140 is spaced apart from the sun gear 120 by a certain distance outside the sun gear 120, and the inner side of the ring gear 140 is engaged with the planetary gears 130 to move in association with rotations of the planetary gears 130. The carrier gear 150 passes through the planetary gears 130 such that it moves in association with revolutions of the planetary gears 130.

According to the exemplary embodiment of the present invention, the ring gear 140 may be coupled to the first cable and move the first cable and the carrier gear 150 may be coupled to the second cable and move the second cable 220. The first cable includes a pair of cables 210a and 210b coupled to the ring gear 140 at upper and lower portions of the ring gear 140, and the second cable also includes a pair of cables 220a and 220b coupled to the carrier gear 150 at upper and lower portions of the carrier gear 150. The first cable and the second cable may be respectively coupled to the ring gear 140 and the carrier gear 150 within the cable housing 200.

The pair of first cables 210a and 210b has same and opposite movement directions with respect to movement of the ring gear 140 respectively, and the pair of second cables 220a and 220b have same and opposite movement directions with respect to movement of the carrier gear 150 respectively.

In an exemplary embodiment of the present invention, the first cable is coupled to the front roll blind to drive it, and the second cable is coupled to the rear roll blind to drive it. Alternatively, the first cable may be coupled to the rear roll blind to drive it, and the second cable may be coupled to the front roll blind to drive it. That is, the first cable and the second cable may drive one of the roll blind set including the front roll blind and the rear roll blind respectively.

Meanwhile, according to the exemplary embodiment of the present invention, the gear stopping device may be engaged with gear teeth of the ring gear 140 or the carrier gear 150 to stop movements of the gears. As illustrated in FIG. 1, the gear stopping device may include the gear stopping member 162 and the solenoid 160 such that the gear stopping member 162 may be moved upward and downward by the solenoid 160.

Figure 2A:
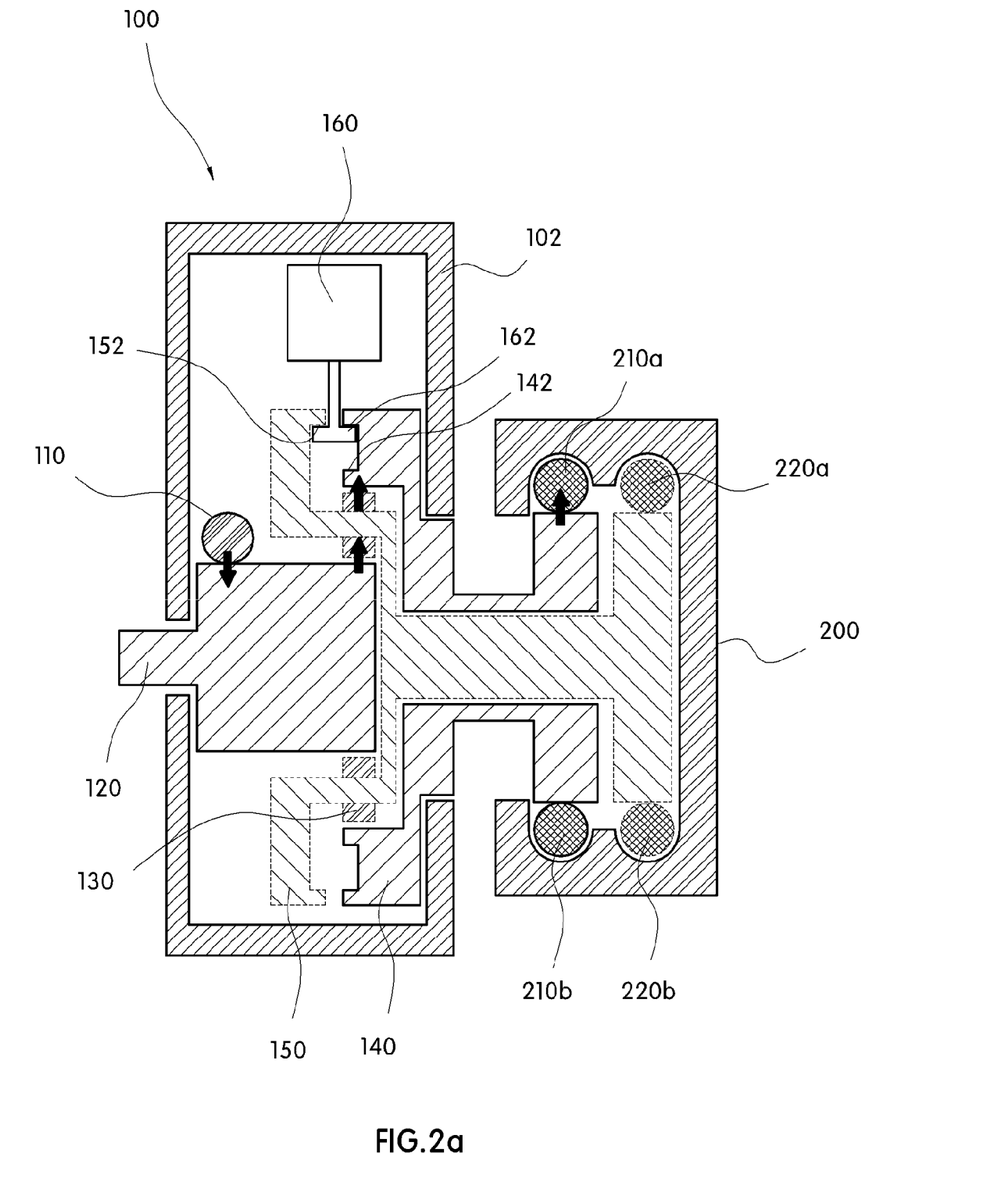
FIGS. 2A and 2B are views illustrating an operation of selectively driving the first cable according to the exemplary embodiment of the present invention.
Figure 2B:
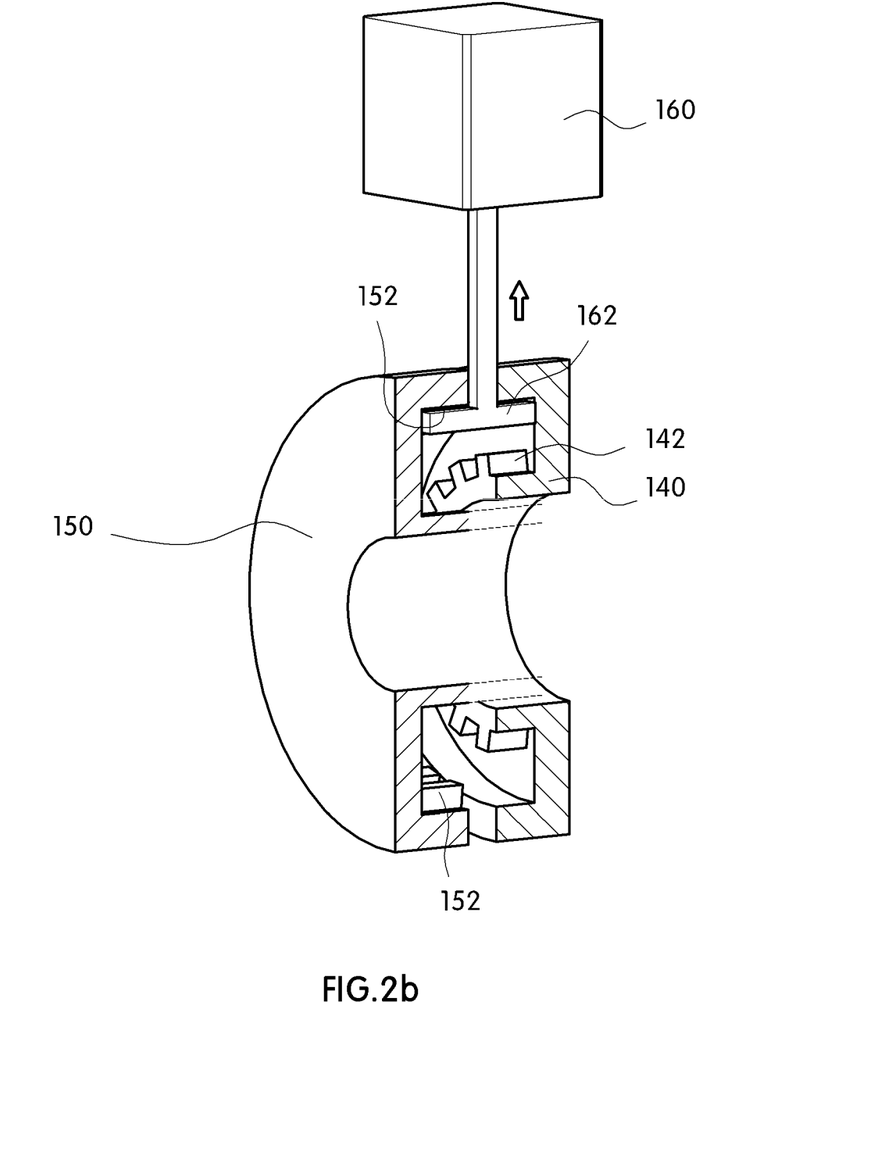
Figure 3A:
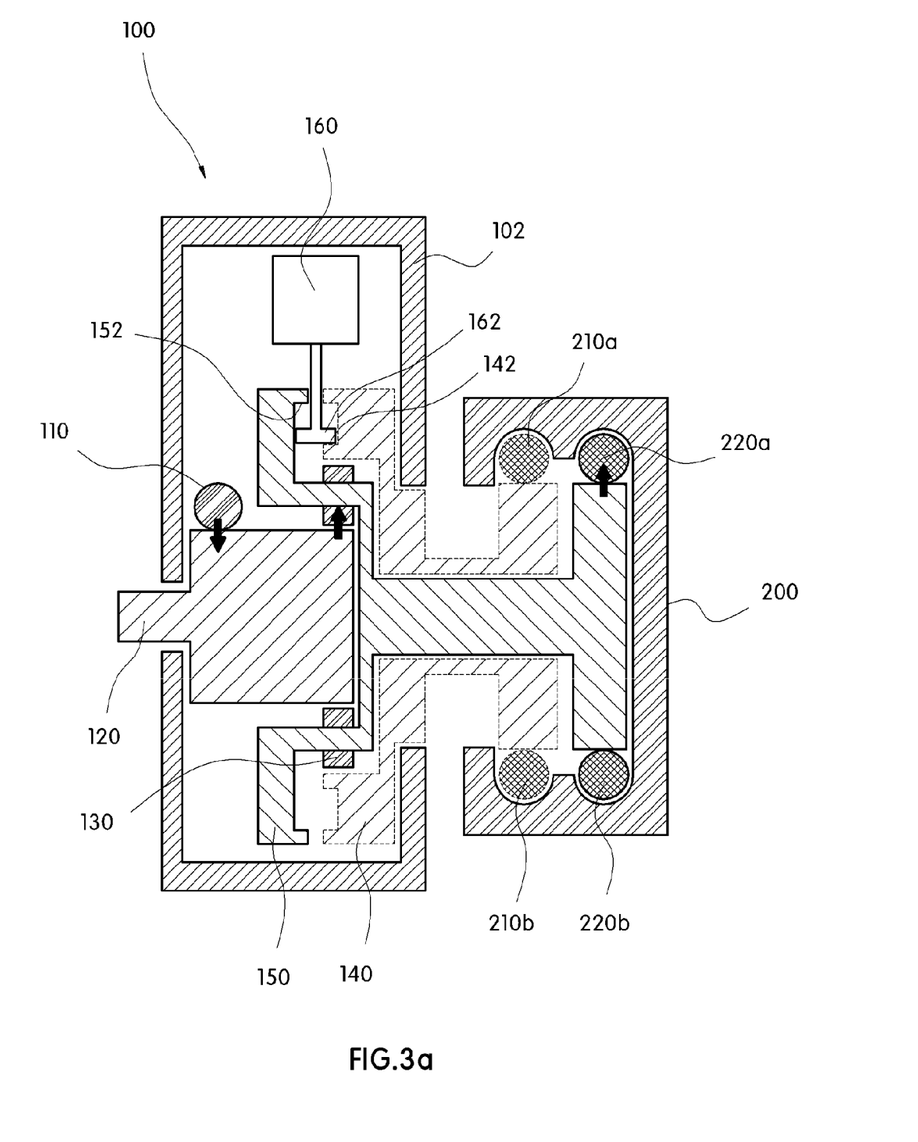
FIGS. 3A and 3B are views illustrating an operation of selectively driving the second cable according to the exemplary embodiment of the present invention.
Figure 3B:
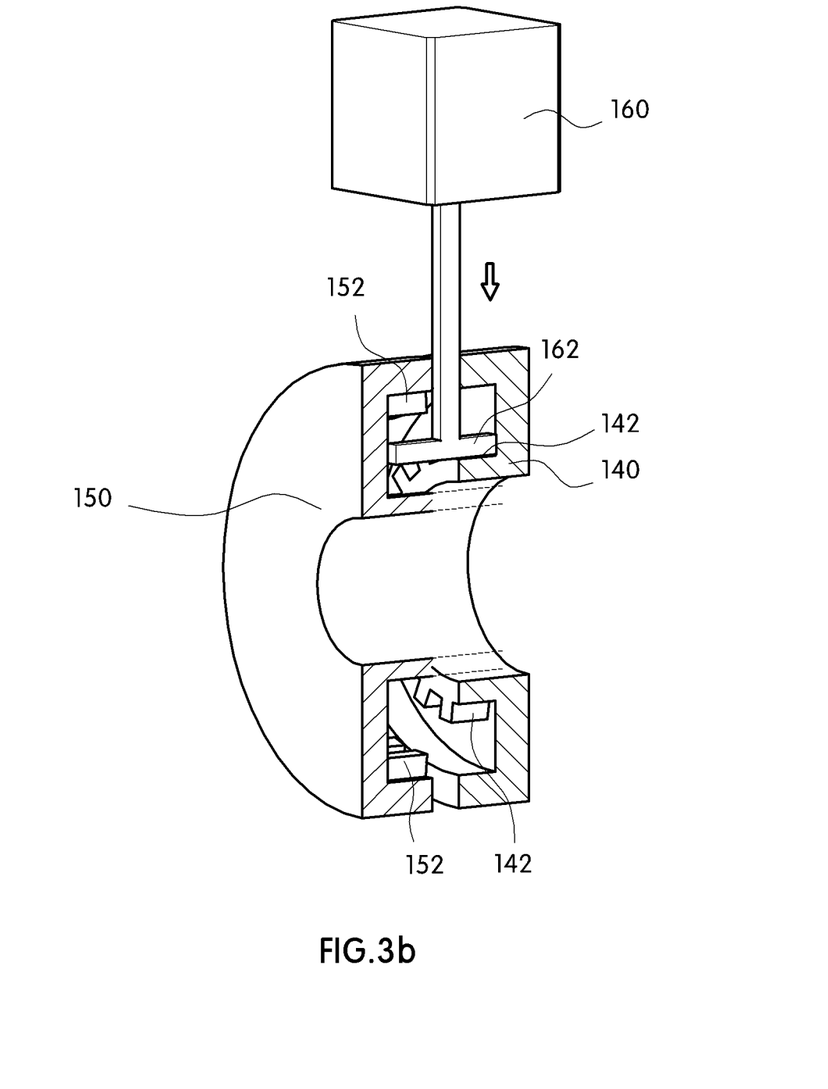

FIGS. 2 and 3 illustrate operations of selectively driving the first cable and the second cable according to upward and downward movements of the gear stopping member 162. FIGS. 2A and 2B illustrate an operation of driving the first cable by stopping of the carrier gear 150 but moving of the ring gear 140, and FIGS. 3A and 3B illustrate an operation of driving the second cable 210 by stopping of the ring gear 140 but moving of the carrier gear 150.

First, as illustrated in FIGS. 2A and 2B, the gear stopping member 162 is moved upward by the solenoid 160, such that it is engaged with the gear teeth 152 of the carrier gear 150, stopping the movement of the carrier gear 150. Accordingly, the planetary gears 130 according to an exemplary embodiment of the present invention do not revolve but rotate due to the carrier gear 150 to rotate the ring gear 140. That is, a driving force of the motor is transferred to the first cable through the motor driving gear 110, the sun gear 120, the planetary gear 130, and the ring gear 140.

Meanwhile, as illustrated in FIGS. 3A and 3B, the gear stopping member 162 is moved downward by the solenoid 160, such that it is engaged with the gear teeth 142 of the ring gear 140, stopping the movement of the ring gear 140. Accordingly, the planetary gears 130 according to an exemplary embodiment of the present invention do not rotate but revolve due to the ring gear 140 to rotate the carrier gear 150. That is, a driving force of the motor is transferred to the second cable through the motor driving gear 110, the sun gear 120, the planetary gear 130, and the carrier gear 150.

Figure 4:
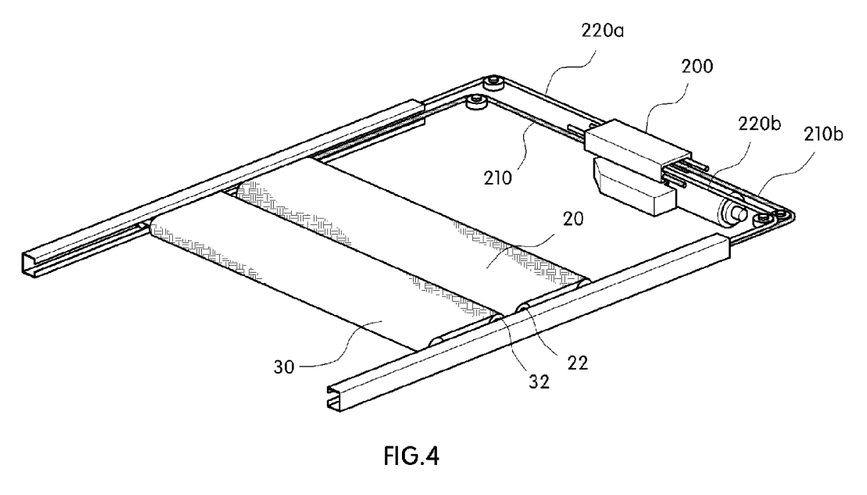
FIG. 4 is a view illustrating connections between a planetary gear set, and a front roll blind and a rear roll blind of the individually operative roll blind type panorama roof according to the exemplary embodiment of the present invention.
Figure 5A:
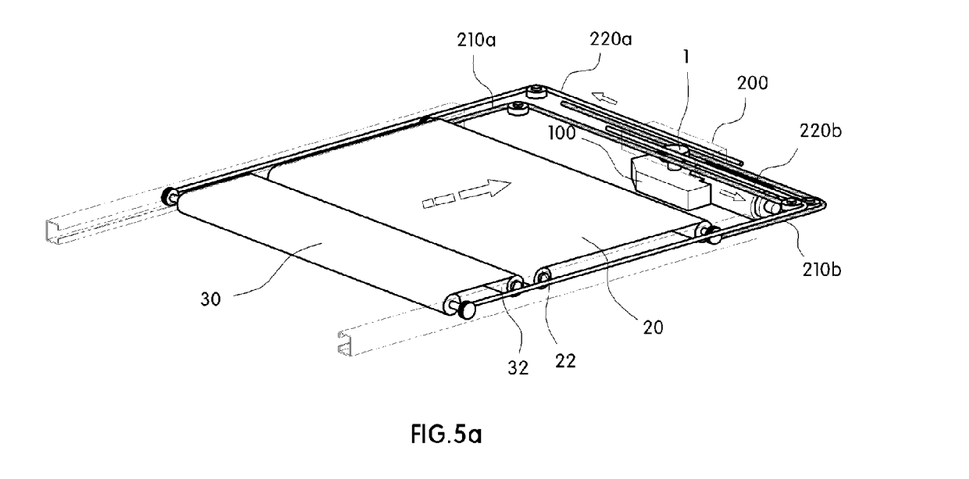
FIGS. 5A and 5B are views illustrating operations of individually closing the front roll blind and the rear roll blind according to the exemplary embodiment of the present invention.
Figure 5B:
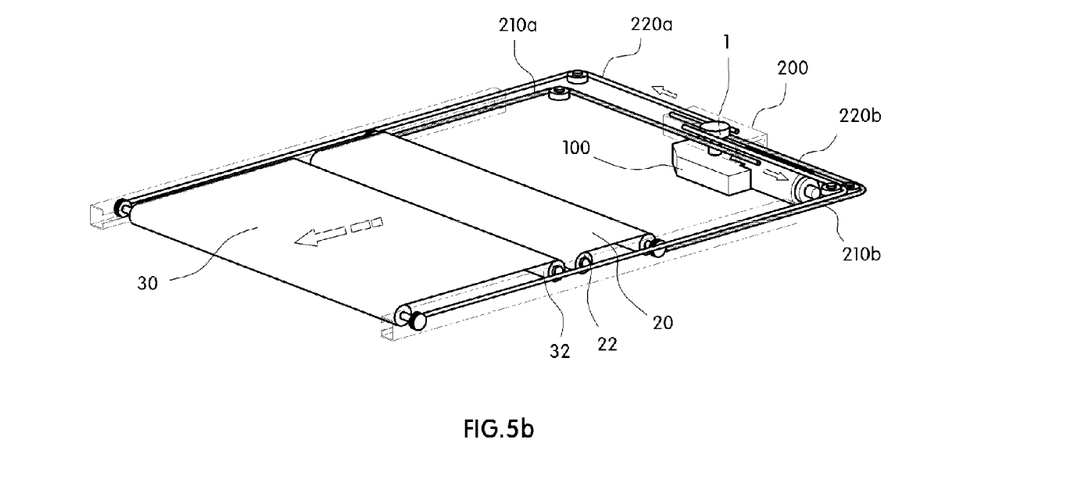

FIG. 4 is a view illustrating connections between a planetary gear set 200, and a front roll blind 20 and a rear roll blind 30 of the individually operative roll blind type panorama roof according to the exemplary embodiment of the present invention. FIG. 5 illustrates operations of individually closing the front roll blind 20 and the rear roll blind 30 according to the exemplary embodiment of the present invention.

According to the exemplary embodiment of the present invention, the first cable may be coupled to opposite sides of the front roll blind 20 and the second cable may be coupled to opposite sides of the rear roll blind 30. Then, as mentioned above, the first cable is coupled to the rear roll blind 30 and the second cable is coupled to the front roll blind 20.

First, the motor 1 rotates counterclockwise with the ring gear being allowed to be selectively moved by the gear stopping device, such that the cable 210a of the first cable may be driven clockwise and the cable 210b may be driven counterclockwise. Accordingly, the front roll blind 20, opposite ends of which are connected to the pair of first cables 210a and 210b, is withdrawn from the roller 22 as illustrated in FIG. 5A to be closed. If the motor 1 is rotated clockwise, the front roll blind 20 may be opened. Meanwhile, clockwise or counterclockwise rotation of the motor 1 is just an example for explaining operations of the panorama roof of the present invention, and the present invention is not limited thereto.

On the other hand, the motor 1 rotates counterclockwise with the carrier gear being allowed to be selectively moved by the gear stopping device, such that the cable 220a of the second cable may be driven counterclockwise and the cable 220b may be driven clockwise. Accordingly, the rear roll blind 30, opposite ends of which are connected to the pair of second cables 220a and 220b, is withdrawn from the roller 32 as illustrated in FIG. 5B to be closed. If the motor 1 is rotated clockwise, the rear roll blind 30 may be opened.

In the individually operative roll blind type panorama roof according to an exemplary embodiment of the present invention, a driving force of one motor 1 is selectively transferred to the front roll blind or the rear roll blind by the planetary gear set 1, individually operating the roll blinds.

For convenience in explanation and accurate definition in the appended claims, the terms "upper", "lower", "inner", "outer,", "front" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An individually operative roll blind type panorama roof comprising:
    a planetary gear set including:
        a sun gear to which a driving force of a motor is applied;
        at least a planetary gear engaged with the sun gear and configured to rotate and revolve;
        a ring gear engaged with the at least a planetary gear and configured to move with rotations of the at least a planetary gear; and
        a carrier gear to which the at least a planetary gear is rotatably mounted and configured to move in association with revolutions of the at least a planetary gear;
    a first roll blind interlocked with the ring gear through a first cable and configured to be driven by the ring gear;
    a second roll blind interlocked with the carrier gear through a second cable and configured to be driven by the carrier gear; and
    a gear stopping device selectively engaged with gear teeth of the ring gear or the carrier gear so as to stop the ring gear or the carrier gear.

2. The individually operative roll blind type panorama roof of claim 1, wherein the first roll blind and the second roll blind form a roll blind set.

3. The individually operative roll blind type panorama roof of claim 1, wherein the gear stopping device includes:
    a gear stopping member selectively engaged with gear teeth of the ring gear or the carrier gear; and
    an actuator connected to the gear stopping member and configured to move the gear stopping member between gear teeth of the ring gear and gear teeth of the carrier gear.

* * * * *